United States Patent [19]

Crayton et al.

[11] Patent Number: 4,864,284

[45] Date of Patent: Sep. 5, 1989

[54] APPARATUS FOR SENSING A FAILED POSITION AND VELOCITY SENSOR

[75] Inventors: John W. Crayton, Washington; Charles T. Kinas, Peoria; Scott G. Sinn, Morton, all of Ill.

[73] Assignee: Caterpillar Inc., Peoria, Ill.

[21] Appl. No.: 130,060

[22] Filed: Dec. 8, 1987

[51] Int. Cl.$^4$ .............................................. G08B 21/00
[52] U.S. Cl. .................................... 340/635; 340/671; 318/605; 324/163
[58] Field of Search ............................. 340/670-672, 340/658, 635, 870.25; 324/163, 161; 73/488, 493, 510, 514; 318/605, 661; 361/236, 239, 242

[56] References Cited

U.S. PATENT DOCUMENTS

| | | | |
|---|---|---|---|
| 3,869,019 | 3/1975 | Cardani | 361/242 |
| 4,121,272 | 10/1978 | Wolfinger | 361/236 |
| 4,125,825 | 11/1978 | Takeuchi et al. | 361/242 |
| 4,319,333 | 3/1982 | Hedrick | 73/488 |
| 4,352,050 | 9/1982 | Sakano | 318/661 |
| 4,358,722 | 11/1982 | Iwakane et al. | 318/661 |
| 4,667,114 | 5/1987 | Rossi | 361/236 |
| 4,740,778 | 4/1988 | Harding et al. | 340/671 |

FOREIGN PATENT DOCUMENTS

| | | | |
|---|---|---|---|
| 0075264 | 4/1986 | Japan | 73/488 |
| 1091203 | 5/1984 | U.S.S.R. | 318/605 |

Primary Examiner—Joseph A. Orsino
Assistant Examiner—Jill D. Jackson
Attorney, Agent, or Firm—Terry D. Morgan; Wei Wei Jeang

[57] ABSTRACT

A self guided vehicle employs a highly accurate velocity sensor to determine vehicle speed and position. The velocity sensor includes a resolver connected to and rotatable with a ground engaging wheel. A resolver to digital converter (R/D) provides a highly accurate 8-bit digital signal representative of the angle of wheel rotation. A second less expensive and less accurate velocity sensor also receives the modulated sine and cosine signals from the resolver and produces a series of pulses representative of vehicle speed. The pulses are produced by detecting the zero crossings of the sine, cosine, and combinations of the sine and cosine signals. The velocity information present in the second velocity sensor signal is not used to actually guide the vehicle, but merely to generally validate the information present in the R/D signal.

6 Claims, 3 Drawing Sheets

APPARATUS FOR SENSING A FAILED POSITION AND VELOCITY SENSOR

TECHNICAL FIELD

This invention relates generally to apparatus for detecting the velocity and position of a vehicle and more particularly to apparatus for detecting a failed velocity and position sensor.

BACKGROUND ART

In the field of self guided vehicles (SGV), accurately sensing the vehicle velocity and position is of particular importance. Obviously, the vehicle must "know" its velocity to properly guide itself along a desired path. Moreover, the basic velocity information is also used to determine instantaneous vehicle position and is important in precisely locating the vehicle. Accordingly, it is not uncommon to employ a high accuracy resolver along with a corresponding resolver to digital converter (R/D) to detect angular wheel position and vehicle velocity. To protect the vehicle from a loss of the resolver signals, copending U.S. application 62,037 filed June 15, 1987 now U.S. Pat. No. 4,740,778 by Harding et al illustrates a circuit for monitoring the resolver output and shutting down the vehicle in response to a loss of the carrier signal.

Additionally, faulty operation can occur due to a failure of the R/D. Failure of the R/D has at least three distinct modes. The R/D may fail with an output that is erratic, an output that indicates the vehicle is moving, or an output that indicates the vehicle is stationary. While any of the three failures is undesirable, the most critical takes place when the vehicle is actually moving and the failed R/D indicates a stationary vehicle. During this type of failure, the vehicle can inadvertently move without guidance assistance. The other two types of faults will lead to calculated positions which are highly inaccurate, but the vehicle will only move under direction from the guidance controller. It is desirable to provide a single, reliable apparatus for detecting any failure of the R/D.

The present invention is directed to overcoming one or more of the problems as set forth above.

DISCLOSURE OF THE INVENTION

In accordance with one aspect of the present invention, there is provided apparatus for detecting a failed velocity sensor of a work vehicle. The velocity sensor has a resolver connected to and rotatable with a ground engaging wheel of the work vehicle so that the resolver continuously delivers a signal having rotational wheel position encoded therein A resolver to digital converter is electrically connected to the resolver so that the resolver to digital converter continuously delivers a digital signal having a magnitude correlative to the wheel's rotational position. The apparatus is comprised of a second velocity sensor electrically connected to the resolver and adapted for delivering a signal correlative to the rate of change of the resolver signal, and processor means for receiving the second velocity sensor signals and the resolver to digital converter signals, computing the rate of change of the digital signals, computing the rate at which the second velocity sensor signals are received, comparing the digital signal rate of change to the rate at which the second velocity sensor signals are received, and discontinuing operation of the vehicle in response to the difference in rates being outside a preselected range.

In accordance with another aspect of the present invention, there is provided apparatus for detecting a failed velocity sensor of a work vehicle. The velocity sensor has a resolver connected to and rotatable with a ground engaging wheel of the work vehicle so that the resolver continuously delivers a signal having rotational wheel position encoded therein. A resolver to digital converter is electrically connected to the resolver so that the resolver to digital converter continuously delivers a digital signal having a magnitude correlative to the wheel's rotational position. The apparatus is comprised of first and second demodulators electrically connected to the resolver and adapted for receiving the resolver signal and respectively deriving sine and cosine signals therefrom, means for receiving the sine and cosine signals and generating pulses at a rate correlative to the frequency of the sine and cosine signals, and processor means for receiving the pulses and the digital signals, computing the rate of change of the digital signals, computing the rate at which the pulses are received, comparing the digital signal rate of change to the rate at which the pulses are received, ad discontinuing operation of the vehicle in response to the difference in rates being outside a preselected range.

In accordance with another aspect of the present invention, there is provided apparatus for detecting a failed velocity sensor of a work vehicle. The velocity sensor has a resolver connected to and rotatable with a ground engaging wheel of the work vehicle so that the resolver continuously delivers a signal having rotational wheel position encoded therein. A resolver to digital converter is electrically connected to the resolver so that the resolver to digital converter continuously delivers a digital signal having a magnitude correlative to the wheel's rotational position. The apparatus is comprised of first and second demodulators electrically connected to the resolver and adapted for receiving the resolver signal and respectively deriving sine and cosine signals therefrom, means for receiving the sine signal, comparing the magnitude of the sine signal to a preselected setpoint, and delivering a pulse in response to the magnitude of the sine signal being substantially equivalent to the preselected setpoint, means for receiving the cosine signal, comparing the magnitude of the cosine signal to a preselected setpoint, and delivering a pulse in response to the magnitude of the cosine signal being substantially equivalent to the preselected setpoint, means for receiving the sine and cosine signals, comparing the magnitudes of the two signals, and delivering a pulse in response to the magnitudes of the sine and cosine signals being substantially equivalent, means for receiving the sine and cosine signals, adding the magnitudes of the two signals, and delivering a signal being the summation of the magnitudes of the sine and cosine signals, means for receiving the summation signal, comparing the magnitude of the summation signal to a preselected setpoint, and delivering a pulse in response to the magnitude of the summation signal being substantially equivalent to the preselected setpoint, and processor means for receiving the pulses and the digital signals, computing the rate of change of the digital signals, computing the rate at which the pulses are received, comparing the digital signal rate of change to the rate at which the pulses are received, and discontinuing operation of the vehicle in response to the difference in rates being outside a preselected range.

Proper operation of a highly accurate resolver based velocity sensor on an SGV is ensured by the use of a second, less expensive and less accurate velocity sensor. The second sensor is not used for velocity or position information, but only to generally validate the speed and position information generated by the more accurate resolver and R/D combination.

BRIEF DESCRIPTION OF THE DRAWINGS

For a better understanding of the present invention, reference may be had to the accompanying drawings, in which.

BEST MODE FOR CARRYING OUT THE INVENTION

Figure 1:
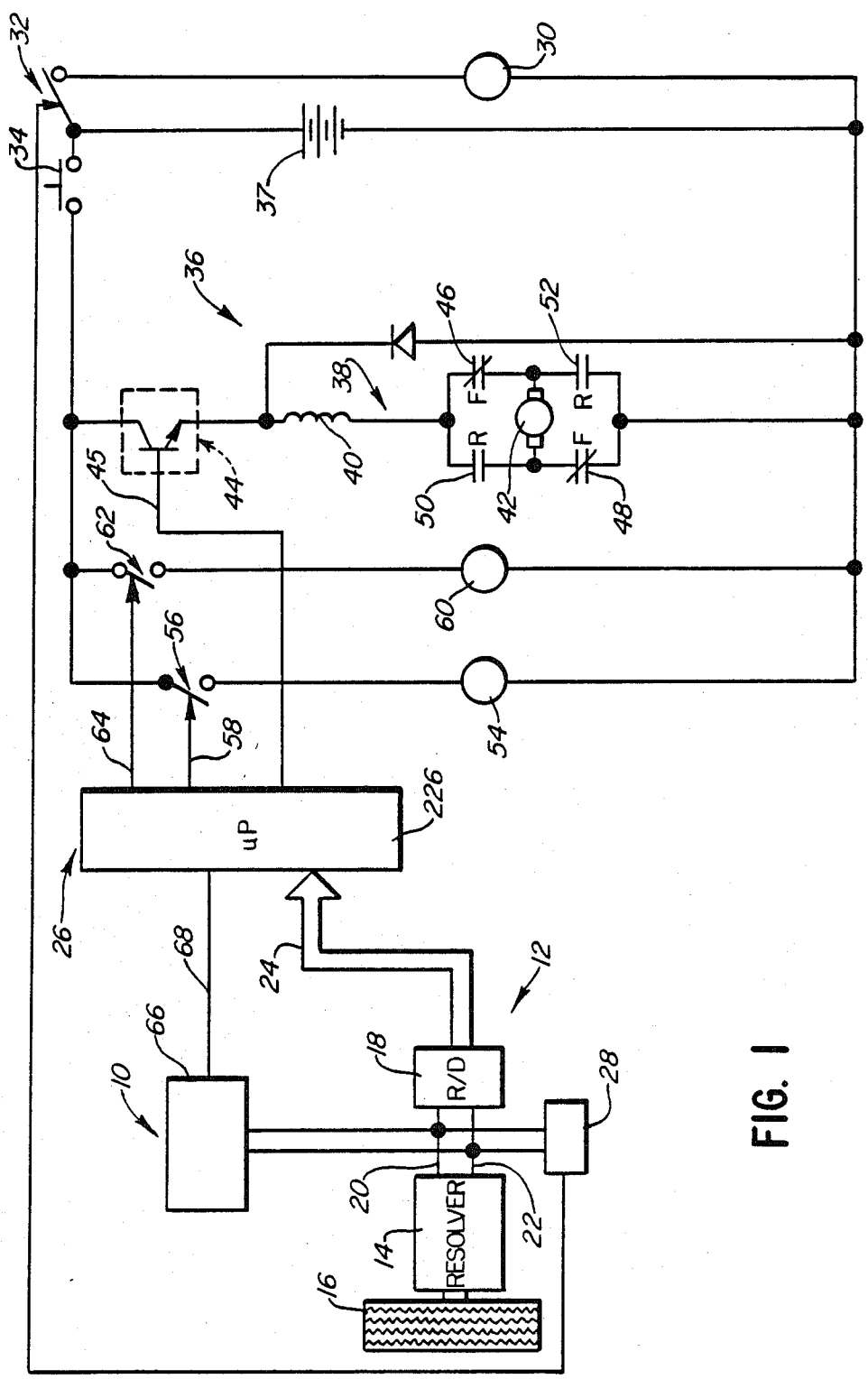
FIG. 1 illustrates a block diagram of one embodiment of the instant apparatus.

FIG. 1 illustrates the apparatus 10 in block diagram form. The apparatus 10 detects a failed velocity sensor 12 of a work vehicle (not shown). Throughout this specification, the sensor 12 is referred to as sensing velocity; however, this is a term of convenience and it should be recognized that the sensor 12 also includes an ability to detect angular wheel position The velocity sensor 12 has a two phase resolver 14 connected to and rotatable with an unpowered ground engaging wheel 16 of the work vehicle, so that the resolver 14 continuously delivers a signal having rotational wheel position encoded therein. The velocity sensor 12 also includes a resolver to digital converter (R/D) 18 which is schematically shown to be electrically connected to the resolver 14 by a pair of leads 20,22. There are actually six lead lines from the resolver 14 which will be discussed in more detail in conjunction with FIG. 2. The R/D 18 continuously delivers an 8-bit digital signal having a magnitude correlative to the wheel's rotational position. The digital signals are delivered over an 8-bit data bus 24 to a processor means 26 Such an arrangement, for sensing vehicle position and velocity, is known in the art and disclosed in copending U.S. application 935,366 filed Nov. 26, 1986 by Telecky et al. now U.S. Pat. No. 4,755,905. Consequently, the operation of the velocity sensor 12 will not be discussed in detail and references to its operation will only be in general terms to enhance the understanding of the apparatus 10.

Also shown connected to the resolver leads 20,22 is a failure detection circuit 28 for the resolver 14. The failure detection circuit is known in the art and disclosed in copending U.S. application 62,037 filed June 15, 1987 by Harding et al. now U.S. Pat. No. 4,740,778. Similarly, detailed discussion of the failure detection circuit is not included herein It is sufficient, for a proper appreciation of the operation of the apparatus 10, to understand that the circuit 28 responds to a loss of the resolver carrier signal to deenergize a line contactor coil 30 by opening a switching element 32. Deenergizing the coil 30 causes the line contactor 34 to open and remove power from the vehicle's electric drive system 36 by disconnecting the vehicle battery 37. The electric drive system 36 includes a traction motor 38 with a series connected field winding 40 and armature 42. Speed control of the motor 38 is effected by a switching element 44 connected in series between the battery 37 and motor 38. A control line 45 interconnects the switching element 44 and the processor means 26. Thus, the processor means 26, operating under software control, varies the duty cycle of a signal applied to the line 45 to effectively control the vehicle speed. Such a control is generally referred to as a chopper type control and is widely known among those skilled in the art of electric drive systems. Also included in the vehicle drive system 36 are a set of contactors 46,48,50,52 used to control the direction of energization of the drive motor 38. Forward contactors 46,48 are normally closed and operate in opposition to the normally open reverse contactors 50,52. Control of the state of the contactors 46,48;50,52 is ultimately governed by the processor means 26 via energization of a coil 54. The coil 54 is connected to the vehicle battery 37 through a switching element 56. A control line 58 interconnects the processor means 26 to the switching element 56. Accordingly, current normally flows from the battery 37 through the switching element 44, field winding 40, forward contactor 46, armature 42, forward contactor 48, and back to the battery 37. If the processor means 36 should desire that the vehicle travel in the reverse direction, the switching element 56 can be closed, energizing the coil 54, and switching the states of the contactors 46,48;50,52. That is, forward contactors 46,48 open and reverse contactors 50,52 close thereby reversing the flow of current through the armature 42 and altering the direction of motor rotation.

Additionally, the processor means 26 also controls a set of spring applied and electrically released vehicle brakes (not shown). A coil 60 normally receives power from the vehicle battery 37 through a switching element 62 to hold the brakes in a disengaged position However, when it is desired that the vehicle should slow or stop, the processor means 26 provides a pulse width modulated signal over a control line 64 to open and close the switching element 62 and allow the brakes to engage. It may be appreciated that the loss of power to the vehicle drive system 36 caused by the failure detection circuit 28 opening the line contactor 34 not only removes power from the drive motor 38, but also removes power from the vehicle's brake coil 54. Therefore, the vehicle's spring applied brakes are fully engaged and the vehicle is quickly stopped. Such action by the circuit 28 will only occur in response to a loss of the resolver signal, and any failure of the R/D 18 will have no effect on the operation of the circuit 28.

The apparatus 10 includes a second velocity sensor 66 electrically connected to the resolver 14 via the leads 20,22 and adapted for delivering a signal over a line 68 to the processor means 26. Throughout the specification the sensor 66 is referred to as sensing velocity; however, like sensor 12, sensor 66 is also capable of detecting angular wheel position and references to it as a velocity sensor are for convenience. The second velocity sensor signal is correlative to the rate of change of the resolver signal, but less accurate than the R/D signal. However, the second velocity sensor signal need not be as accurate because it is not intended to convey speed or position information for the purpose of guiding the vehicle. Rather, the second velocity sensor signal is used to generally validate the R/D signal. The processor means 26, acting under software control, receives the second velocity sensor signals on line 68 and the R/D signals on the bus 24, computes the rate of change of the digital signals, computes the rate at which the second velocity sensor signals are received, compares the digital signal rate of change to the rate at which the second velocity sensor signals are received, and discontinues operation of the vehicle in response to the difference in rates being outside a preselected range. Preferably, the processor means 26 will discontinue pulsing the switching means 44 and also apply the vehicle brakes On the other hand, if both signals are generally similar, then the software guidance routines continue, using only the R/D signal for position and velocity information.

Figure 2:
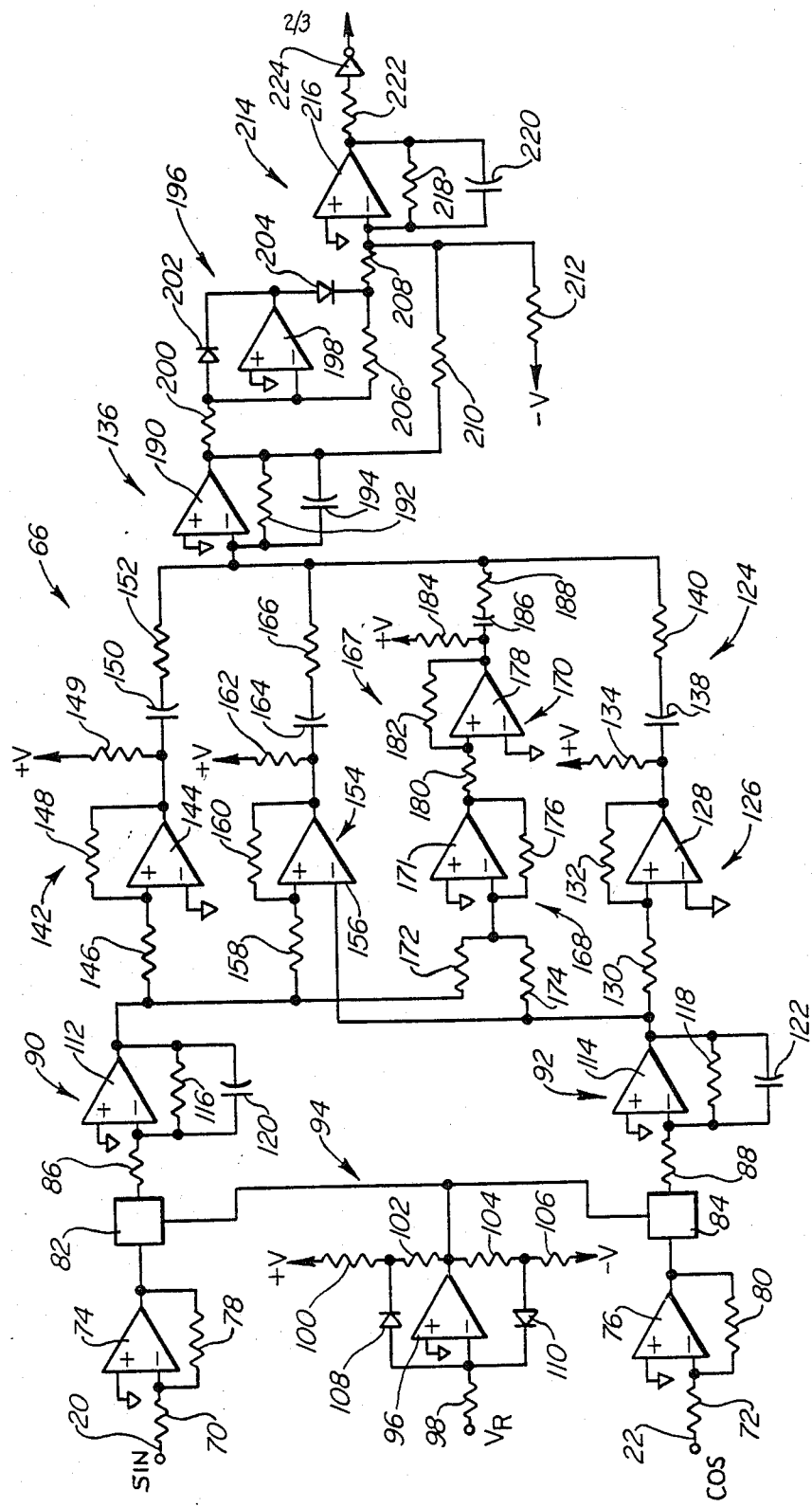
FIG. 2 illustrates an electrical schematic of one embodiment of the instant apparatus.

Referring now to FIG. 2, where a diagrammatic representation of the apparatus 10 is illustrated, the resolver lead lines 20,22 are shown connected through respective resistors 70,72 to the negative inputs of operational amplifiers 74,76. The modulated sine and cosine signals are respectively delivered from the resolver 14 over the lead lines 20,22. The amplifiers 74,76 each have a feedback resistor 78,80 interconnecting their negative inputs and outputs. Further, both of the amplifier's negative inputs are connected to reference outputs from the resolver 14. The amplifier's outputs are also connected to the inputs of first and second bilateral switches 82,84. The outputs of the switches 82,84 are respectively connected through resistors 86,88 to a pair of low-pass filters 90,92. The bilateral switches 82,84 form a portion of a demodulator 94 which includes an operational amplifier 96 with a noninverting and an inverting input electrically connected to opposite leads of the resolver carrier signal $V_R$ through a resistor 98. A set of four resistors 100,102,104,106 are serially connected between $+V$ and $-V$ with the intersection of resistors 102,104 being connected to the amplifier 96 output. The intersection of resistors 100,102 is connected through a reverse biased diode 108 to the inverting input of the amplifier 96. Similarly, the intersection of resistors 104,106 is connected through a reverse biased diode 110 to the inverting input of the amplifier 96. The switches 82,84 receive control inputs from the amplifier 96 and are preferably of the type available from Motorola, Inc. of Schaumburg, Ill. as part number MC4016B. The demodulator 94 operates to detect the sign of the carrier signal $V_R$ so that the demodulators 82,84 are enabled to pass a signal representative of the modulated signal envelope (i.e. angular position phase).

The low-pass filters 90,92 each have an operational amplifier 112,114 with a noninverting input connected to ground and a feedback resistor 116,118 and capacitor 120,122 connected in parallel between the amplifier noninverting input and output. Since the sine and cosine signals have a frequency related to the vehicle speed and the speed of the vehicle is known to be within a very limited range, the low-pass filters 90,92 can be tuned to only pass those signals which fall within the acceptable frequency range. Clearly, any signal outside the acceptable range can be assumed to be the reference frequency and its removal will only enhance the operation of the second velocity sensor 66.

Means 124 is responsible for delivering the second velocity sensor signal by generating pulses at a rate correlative to the frequency of the sine and cosine signals. The means 124 includes means 126 for receiving the cosine signal, comparing the magnitude of the cosine signal to a preselected setpoint, and delivering a pulse in response to the magnitude of the cosine signal being substantially equivalent to the preselected setpoint. The means 126 includes a comparator 128 which has a noninverting input connected through a resistor 130 to the output of the low-pass filter 92. In the preferred embodiment, the inverting input is connected to system ground. Accordingly, the preselected setpoint is system ground and the means 126 acts as a zero crossing detector A feedback resistor 132 connected between the comparator output and the noninverting input provides a positive hysteresis to the comparator switching point to prevent oscillations in the comparator output signal. Preferably the resistors 130,132 are selected to provide 1% positive hysteresis. The output of the comparator 128 is connected to $+V$ through a pull up resistor 134 and to a differentiator 136.

Similarly, means 142 receives the sine signal, compares the magnitude of the sine signal to a preselected setpoint, and delivers a pulse in response to the magnitude of the sine signal being substantially equivalent to the preselected setpoint. The means 142 includes a comparator 144 which has a noninverting input connected through a resistor 146 to the output of the low-pass filter 90. In the preferred embodiment, the inverting input is connected to system ground. A feedback resistor 148 is disposed between the noninverting input and the output of the comparator 144 and is selected to provide the preferred 1% hysteresis. The comparator output is connected to $+V$ through a pull up resistor 149 and to the differentiator 136.

Means 154 receives the sine and cosine signals, compares the magnitudes of the two signals, and delivers a pulse in response to the magnitudes of the sine and cosine signals being substantially equivalent. The means 154 includes a comparator 156 which has an inverting input connected to the output of the low-pass filter 92, and a noninverting input connected through a resistor 158 to the output of the low-pass filter 90. A feedback resistor 160 interconnects the comparator output to the noninverting input and provides the desired 1% positive hysteresis. It can be readily appreciated that the output of the comparator 156 is the sine signal minus the cosine signal. The output of the comparator 156 is connected to $+V$ through a pull up resistor 162 and to the differentiator 136.

Finally, means 167 which compares the summation of the cosine and sine signals to a preselected setpoint includes separate means 168,170 to prevent oscillations in the output by adding the sine and cosine signals prior to comparing their sum to the preselected setpoint Such an arrangement yields a signal identical to comparing the sine to the inverted cosine (or vice versa), but avoids transient oscillation problems.

The means 168 receives the sine and cosine signals, adds the magnitudes of the two signals, and delivers a signal which is the summation of the magnitudes of the sine and cosine signals The means 168 includes a summing amplifier 171 which has an inverting input connected to the output of the low-pass filter 90 via a resistor 172 and to the output of the low-pass filter 92 through a resistor 174. A feedback resistor 176 interconnects the summing amplifier's output and inverting input and the noninverting input is connected to system ground.

The means 170 receives the summation signal, compares the magnitude of the summation signal to a preselected setpoint, and delivers a pulse in response to the magnitude of the summation signal being substantially equivalent to the preselected setpoint The means 170 includes a comparator 178 which has a noninverting input connected through a resistor 180 to the output of the summing amplifier 171. A feedback resistor 182 connected intermediate the comparator output and noninverting input provides the preferred 1% positive hysteresis. The output of the comparator 178 is connected to +V through a pull up resistor 184 and to the differentiator 136.

The output signals of the comparators 128,144,156,178 are square wave signals corresponding in phase and frequency to the zero crossings of their respective input signals. For example, the output of the comparator 128 switches between +V and −V in response to the magnitude of the cosine wave input signal respectively rising above the preselected setpoint of 0V and falling below the same setpoint. Accordingly, the outputs of the comparators are substantially identical in frequency and magnitude, but each varies in phase by one-eighth of the period of the reference signal. Thus, the differentiator 136, which responds to the rate of change of its input signal, will produce negative voltage spikes for each transition from −V to +V and positive voltage spikes for each transition from +V to −V. Because each comparator will be responsible for generating one positive and one negative transition during each period of wheel revolution, a total of eight equally spaced pulses will be produced by the differentiator 136.

The differentiator 136 includes an operational amplifier 190 having a noninverting input connected to ground and an inverting input connected to the outputs of the comparator 128,144,156,178 through serially connected differentiating capacitors 138,150,164,186 and current limiting resistors 140,152,166,188, respectively. A feedback resistor 192 and capacitor 194 are connected in parallel between the comparator output and noninverting input. The output of the operational amplifier 190 is connected to an absolute value detection circuit 196. The absolute value detection circuit 196 converts all of the pulses delivered by the differentiator 136 into negative pulses.

The absolute value detection circuit 196 includes an operational amplifier 198 interconnected with a pair of diodes 202,204 and resistors 200,206 to form an inverting ideal diode circuit. This circuit produces an output voltage at the junction of diode 204 and resistor 206 which has the same magnitude, but a positive sign when the input voltage is negative and is zero when the input voltage is positive. Accordingly, the ideal diode circuit produces half the number of pulses produced by the differentiator 136. Each positive pulse corresponds in time and magnitude to each negative pulse from the differentiator 136.

The absolute value detection circuit also includes an operational amplifier 216, resistors 208,210,212,218, and a capacitor 220 connected as an inverting summing circuit. The output of the differentiator 136 is connected through the resistor 210 to the inverting input of the amplifier 216. Similarly, the output of the ideal diode circuit is connected through the resistor 208 to the inverting input of the amplifier 216. The values of the resistors 208,210,218 are selected such that the magnitude of the ideal diode circuit is doubled while the magnitude of the differentiator 136 remains unchanged. It can be seen that summing these two signals will result in a series of substantially identical negative pulses having a frequency substantially identical to the output of the differentiator 136. The output of the absolute value circuit 196 is negative with either positive or negative voltage input. The magnitude of the output voltage equals the magnitude of the input voltage without regard to the sign of the input voltage.

It is known to those skilled in the art of circuit design that the sign of the ideal diode circuit could be reversed so that the sign of the absolute value circuit 196 would then be positive. The selection of the sign of the circuitry to produce negative pulses was advantageously chosen to improve the reliability of the circuit The negative pulses from the absolute value circuit 196 are delivered through a current limiting resistor 222 to an inverting driver amplifier 224. However, the inverting driver amplifier is a 5 volt device which produces a 5 volt output in response to a zero or negative voltage input. Conversely, a positive 5 volt input will hold the output at zero volts. It can be seen that the output of the amplifier 216 produces the proper pulse voltage sign, but the quiescent voltage value is wrong. Therefore, to properly interface the amplifier 216 and the inverting driver amplifier 224 it is only necessary to adjust the quiescent voltage of the amplifier 216. This is accomplished via the resistor 212 connected to a negative voltage supply −V. The value of the resistor 212 is selected to produce a +5 V offset at the output of the amplifier 216. Thus, the output of the amplifier 216 has a quiescent value of +5 V and responds to positive or negative pulses in the range of 5 to 20 volts from the differentiator 136 with a negative pulse of zero or less.

The inverting driver amplifier 224 acts as a driver stage to the processor means 26 which includes a microprocessor 226.

Figure 3:
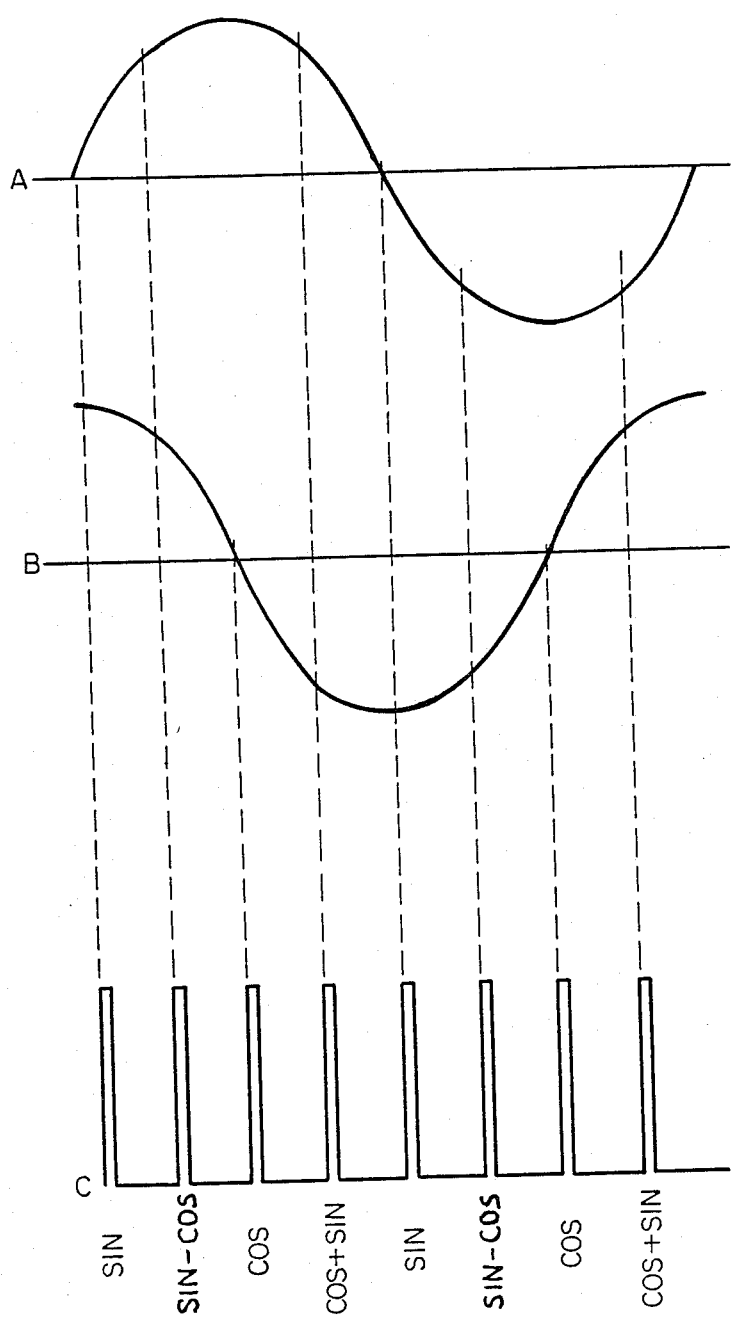
FIG. 3 illustrates a diagrammatic representation of an electrical waveform of the instant apparatus.

Referring now to FIG. 3, the operation of the second velocity sensor 66 can be described. First, the waveforms shown at A and B respectively represent the demodulated sine and cosine signals present at the outputs of the filters 90,92. The waveform shown at C represents the output of the driver 224. It may be readily seen from FIG. 3C that there are eight pulses within a single period of the sine wave. The pulses are labeled as corresponding to the comparators 128,156,144,178 and each occurs twice, indicative of the positive and negative transition of the comparators 128,156,144,178. It should also be appreciated that one period of the sine wave corresponds to one revolution of the ground engaging wheel 16. In the preferred embodiment, the ground engaging wheel 16 has a circumference of approximately 1.43 meters. Thus, a pulse is generated for each one-eighth revolution, or a pulse for every 0.179 meters traveled. At this pulse rate the vehicle can be stopped within a desirable distance at even maximum velocity For example, by using the eight pulses generated by the second velocity sensor 66, the vehicle starting from rest could only reach a velocity of 0.6 m/s before detecting a failed R/D 18. Alternatively, if only the two pulses generated by the sine wave were used, then the vehicle could reach a velocity of 1.2 m/s before detecting the fault.

Industrial Applicability

In the overall operation of the apparatus 10, assume that the work vehicle is traveling at a substantially constant velocity of 1 m/s. The resolver 18 continually delivers the time varying sine and cosine signals to both the R/D 18 and the second velocity sensor 66. The R/D sequentially updates the 8-bit digital number supplied to the processor means 26. The processor means 26 relies upon the entire 8-bits to determine vehicle position, but only utilizes the least significant bit to determine vehicle velocity. The rate at which the least significant bit changes between the 0 and 1 states is an accurate representation of vehicle speed.

Simultaneously, the second velocity sensor 66 demodulates the resolver sine and cosine signals and produces the eight pulses per wheel revolution and continuously delivers the pulses to the processor means 26. At the vehicle speed of 1 m/s the second velocity sensor 66 produces a pulse every 0.179 seconds. The processor means 26 receives the pulses and calculates the velocity based upon the time between pulses. Therefore, at this velocity the processor means can validate the R/D signal every 0.179 seconds. Therefore, the vehicle may travel only 0.179 meters before a faulty R/D signal is detected.

As long as the velocity calculated from both sensors 12,66 is generally equivalent, the vehicle continues operation under control of the guidance software. However, a significant difference in the calculated velocities of the two sensors 12,66 causes the processor means 26 to immediately stop the vehicle and await servicing.

Other aspects, objects, and advantages of this invention can be obtained from a study of the drawings, the disclosure, and the appended claims.

We claim:

1. An apparatus for detecting a failed velocity sensor of a work vehicle, the velocity sensor having a resolver connected to and rotatable with a ground engaging wheel of the work vehicle so that the resolver continuously delivers a signal and respectively deriving first and second periodic signals therefrom having rotational wheel position encoded therein, and a resolver to digital converter electrically connected to the resolver so that the resolver to digital converter continuously delivers a digital signal having a magnitude correlative to the wheel's rotational position, the apparatus comprising:

a second velocity sensor electrically connected to the resolver and adapted for comparing the magnitude of the first periodic signal to a first preselected setpoint, comparing the magnitude of the second periodic signal to a second preselected setpoint, comparing the magnitudes of the first and second periodic signals, comparing the magnitude of the sum of the first and second periodic signals to a third preselected setpoint, differentiating the signals derived from the comparisons, and delivering a signal correlative to the rate of change of the first and second periodic signals; and processor means for receiving the second velocity sensor signals and the resolver to digital converter signals, computing the rate of change of the digital signals, computing the rate at which the second velocity sensor signals are received, comparing the digital signal rate of change to the rate at which the second velocity sensor signals are received, and discontinuing operation of the vehicle in response to the difference in rates being outside a preselected range.

2. An apparatus, as set forth in claim 1, wherein the second velocity sensor includes first and second demodulators electrically connected to the resolver and adapted for receiving the resolver signal and respectively deriving the first and second periodic signals therefrom, first and second low pass filters configured for receiving the demodulated first and second periodic signals and passing signals within a preselected range, and wherein the second velocity sensor signal is delivered by means for generating pulses at a rate correlative to the frequency of the first and second periodic signals.

3. An apparatus for detecting a failed velocity sensor of a work vehicle, the velocity sensor having a resolver connected to and rotatable with a ground engaging wheel of the work vehicle so that the resolver continuously delivers a signal having rotational wheel position encoded therein, and a resolver to digital converter electrically connected to the resolver so that the resolver to digital converter continuously delivers a digital signal having a magnitude correlative to the wheel's rotational position, the apparatus comprising:

a second velocity sensor having first and second demodulators electrically connected to the resolver and adapted for receiving the resolver signal and respectively deriving sine and cosine signals therefrom, and wherein the second velocity sensor signal includes:

means for receiving the sine signal, comparing the magnitude of the sine signal to a first preselected setpoint, and delivering a pulse in response to the magnitude of the sine signal being substantially equivalent to the first preselected setpoint;

means for receiving the cosine signal, comparing the magnitude of the cosine signal to a second preselected setpoint, and delivering a pulse in response to the magnitude of the cosine signal being substantially equivalent to the second preselected setpoint;

means for receiving the sine and cosine signals, comparing the magnitudes of the two signals, and delivering a pulse in response to the magnitude of the sine and cosine signals being substantially equivalent;

means for receiving the sine and cosine signals, adding the magnitudes of the two signals, and delivering a signal being the summation of the magnitudes of the sine and cosine signals;

means for receiving the summation signal, comparing the magnitude of the summation signal to a third preselected setpoint, delivering a pulse in response to the magnitude of the summation signal being substantially equivalent to the third preselected setpoint, and the second velocity sensor adapted for delivering a signal correlative to the rate of change of the resolver signal; and processor means for receiving the second velocity sensor signals and the resolver to digital converter signals, computing the rate of change of the digital signals, computing the rate at which the second velocity sensor signals are received, comparing the digital signal rate of change to the rate at which the second velocity sensor signals are received, and discontinuing operation of the vehicle in response to the difference in rates being outside a preselected range.

4. An apparatus for detecting a failed velocity sensor of a work vehicle, the velocity sensor having a resolver connected to and rotatable with a ground engaging wheel of the work vehicle so that the resolver continuously delivers a signal having rotational wheel position encoded therein, and a resolver to digital converter electrically connected to the resolver so that the resolver to digital converter continuously delivers a digital signal having a magnitude correlative to the wheel's rotational position, the apparatus comprising:

first and second demodulators electrically connected to the resolver and adapted for receiving the resolver signal and respectively deriving sine and cosine signals therefrom;

means for receiving the sine signal, comparing the magnitude of the sine signal to a first preselected setpoint, and delivering a pulse in response to the magnitude of the sine signal being substantially equivalent to the first preselected setpoint;

means for receiving the cosine signal, comparing the magnitude of the cosine signal to a second preselected setpoint, and delivering a pulse in response to the magnitude of the cosine signal being substantially equivalent to the second preselected setpoint;

means for receiving the sine and cosine signals, comparing the magnitudes of the two signals, and delivering a pulse in response to the magnitudes of the sine and cosine signals being substantially equivalent;

means for receiving the sine and cosine signals, adding the magnitudes of the two signals, and delivering a signal being the summation of the magnitudes of the sine and cosine signals;

means for receiving the summation signal, comparing the magnitude of the summation signal to a third preselected setpoint, and delivering a pulse in response to the magnitude of the summation signal being substantially equivalent to the third preselected setpoint; and processor means for receiving the pulses and the digital signals, computing the rate of change of the digital signals, computing the rate at which the pulses are received, comparing the digital signal rate of change to the rate at which the pulses are received, and discontinuing operation of the vehicle in response to the difference in rates being outside a preselected range.

5. An apparatus for detecting a failed velocity sensor of an automatic guided vehicle having at least three wheels, and at least one of which is a powered drive wheel, the velocity sensor having a resolver connected to and rotatable with a ground engaging wheel other than the powered drive wheel so that the resolver continuously delivers a signal having rotational wheel position encoded therein, and a resolver to digital converter electrically connected to the resolver so that the resolver to digital converter continuously delivers a digital signal having a magnitude correlative to the wheel's rotational position, the apparatus comprising:

first and second demodulators electrically connected to the resolver and adapted for receiving the resolver signal and respectively deriving sine and cosine signals therefrom;

means for receiving the sine signal, comparing the magnitude of the sine signal to a first preselected setpoint, and delivering a pulse in response to the magnitude of the sine signal being substantially equivalent to the first preselected setpoint;

means for receiving the cosine signal, comparing the magnitude of the cosine signal to a second preselected setpoint, and delivering a pulse in response to the magnitude of the cosine signal being substantially equivalent to the second preselected setpoint;

means for receiving the sine and cosine signals, comparing the magnitudes of the two signals, and delivering a pulse in response to the magnitudes of the sine and cosine signals being substantially equivalent;

means for receiving the sine and cosine signals, adding the magnitudes of the two signals, and delivering a signal being the summation of the magnitudes of the sine and cosine signals;

means for receiving the summation signal, comparing the magnitude of the summation signal to a third preselected setpoint, and delivering a pulse in response to the magnitude of the summation signal being substantially equivalent to the third preselected setpoint; and processor means for receiving the pulses and the digital signals, computing the rate of change of the digital signals, computing the rate at which the pulses are received, comparing the digital signal rate of change to the rate at which the pulses are received, and discontinuing operation of the vehicle in response to the difference in rates being outside a preselected range.

6. A method for detecting a failed velocity sensor of a work vehicle, the velocity sensor having a resolver connected to and rotatable with a ground engaging wheel other than the powered drive wheel, so that the resolver continuously delivers a signal having rotational wheel position encoded therein, and a resolver to digital converter electrically connected to the resolver so that the resolver to digital converter continuously delivers a digital signal having a magnitude correlative to the wheel's rotational position, the method comprising the steps of:

demodulating the resolver signal and respectively deriving sine and cosine signals therefrom;

comparing the magnitude of the sine signal to a first preselected setpoint, and delivering a pulse in response to the magnitude of the sine signal being substantially equivalent to the first preselected setpoint;

comparing the magnitude of the cosine signal to a second preselected setpoint, and delivering a pulse in response to the magnitude of the cosine signal being substantially equivalent to the second preselected setpoint;

comparing the magnitudes of the two signals, and delivering a pulse in response to the magnitudes of the sine and cosine signals being substantially equivalent;

receiving the sine and cosine signals, adding the magnitudes of the two signals, and delivering a signal being the summation of the magnitudes of the sine and cosine signals;

comparing the magnitude of the summation signal to a third preselected setpoint, and delivering a pulse in response to the magnitude of the summation signal being substantially equivalent to the third preselected setpoint; and computing the rate of change of the digital signals, computing the rate at which the pulses are received, comparing the digital signal rate of change to the rate at which the pulses are received, and discontinuing operation of the vehicle in response to the difference in rates being outside a preselected range.

* * * * *